Patented Jan. 29, 1935

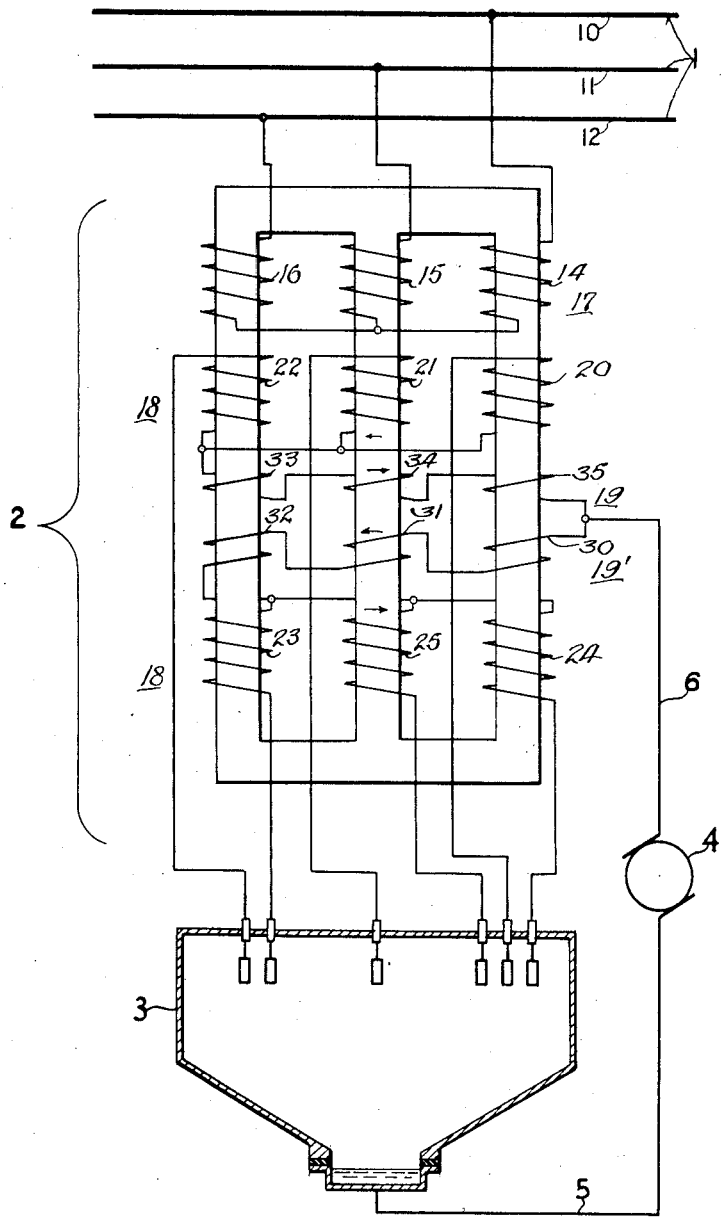

1,989,640

UNITED STATES PATENT OFFICE 1,989,640

TRANSFORMER CONSTRUCTION

Erwin Kern, Wettingen, Switzerland, assignor to Aktiengesellschaft Brown Boveri & Cie., Baden, Switzerland, a joint-stock company of Switzerland Application November 11, 1929, Serial No. 406,244
In Germany November 24, 1928

5 Claims. (Cl. 175—363)

This invention relates to improvements in electric power current rectifying systems of the metallic vapor type and, particularly, to such systems as will maintain a constant voltage in the direct current output circuit of the system, regardless of the load upon the direct current circuit.

It has been found that the usual electric power rectifying system of the metallic vapor type is subject to a steep voltage rise when the load on the direct current circuit drops from the usual load to practically no load. Such voltage increase has such an objectionable effect on the apparatus connected with the system, that various methods have been proposed to avoid the steep voltage rise. Among such methods were the provision of absorption reactance coils which were arranged to be supplied with a current of the third harmonic taken from a highly saturated transformer, the primary of which transformer was usually connected in star and the secondary of which was usually connected in open delta. Another method for preventing a steep voltage rise, at low load, in electric power rectifiers was the connection of single phase transformers in combination with absorption reactance coils. A comparatively larger amount of space was, however, required to properly arrange the rectifier supply transformer, the single phase excitation transformers and the absorption reactance coils.

It has been found by applicant that the third harmonic in the supply transformer for the rectifier may itself be utilized to prevent a steep voltage rise at low load by connecting auxiliary windings, divided into two portions to the star points of the secondary windings of a highly saturated multi-phase transformer. The auxiliary windings are so proportioned that the third harmonic current induced therein opposes the third harmonic current induced in the secondary winding and is, at least, of the same value so that the phase of the third harmonic in the secondary is rotated about 180°.

It is, therefore, among the objects of the present invention to provide an electric power rectifying system in which the voltage will be maintained substantially constant, regardless of the load upon the rectifier.

Another object of the invention is to provide a transformer supply system for the anodes of an electric power rectifier which system, as a unit, will contain all of the windings necessary, both for properly transforming the current supply to the rectifier and for preventing a voltage rise at loads below a predetermined value in the rectifier.

A further object of the invention is to provide a transformer unit for an electric power rectifying system which will be provided with primary, secondary and auxiliary windings, arranged in such a manner that the third harmonic current therein will be utilized to prevent a voltage rise at loads below a predetermined value without the addition of absorption reactance coils, single phase transformers or other devices.

Objects and advantages, other than those above set forth, will be apparent in the following description and in the drawing, which diagrammatically shows an embodiment of the present invention.

Referring more particularly to the drawing by characters of reference, the reference numeral 1 indicates a multi-phase alternating current supply system connected by means of a current transformer structure indicated generally at 2 to a rectifier of the metallic vapor type, schematically shown at 3, which supplies a direct current consuming device 4, connected by means of conductors 5 and 6 to the transformer unit 2, and to the cathode of the rectifier 3 to form a direct current circuit.

The alternating current supply system includes phases 10, 11 and 12 which are connected with the several windings 14, 15 and 16, forming a star-connected primary winding 17 of the current transforming unit 2. The secondary winding 18 is divided into a plurality of portions 20, 21, 22, 23, 24 and 25 which are so connected as to form two star-connected portions supplying the anodes of the rectifier 3.

Auxiliary windings 19, 19' having the several coils 30, 31, 32, 33, 34, 35, are arranged in adjacent relation with the primary winding 17 and the secondary winding 18 in such manner that the neutral point of the secondary coils 20, 21 and 22 is series-connected with one end of the coils 33, 34 and 35 and the neutral point of the coils 23, 24 and 25 of the second portion of the secondary winding 18 is connected with one end of the series connected coils 32, 31, 30. The third harmonic current induced in the secondary winding 18 is in opposition to that induced in the auxiliary windings 19 and 19' so that all possibilities of a voltage rise at loads below a predetermined value in the rectifier current circuit are decreased to a negligible value. If the auxiliary windings 19 and 19' are so proportioned that the third harmonic voltage occurring therein is greater in its action than that of the secondary winding 18 then the phase of the third harmonic in the secondary of the transformer is rotated about 180° and is, therefore, brought into the proper position. The transformer structure 2 may be of the type arrangement core, or may be of the shell type arrangement, as may be most desirable. In the connection shown for the auxiliary windings 19 and 19', the special advantage is obtained that the direct current magnetization of the transformer core is compensated by the current flow through the several coils of the auxiliary windings 19 and 19'.

Although but one embodiment of this invention has been illustrated and described, it will be understood that various other embodiments are possible, and that various changes may be made without departing from the spirit of the invention or the scope of the appended claims.

The invention claimed is:

1. In an electric power rectifying system, a multi-phase alternating current system, an electric current rectifier supplying a direct current circuit, and a unitary transformer structure connecting said supply system and said rectifier comprising a star-connected primary winding, a star-connected secondary winding, and an open delta-connected auxiliary winding inductively coupled with the primary and the secondary winding and connected with said secondary winding in such manner as to inhibit a voltage rise at loads below a predetermined value on said rectifier.

2. In an electric power rectifying system, a multi-phase alternating current system, an electric current rectifier supplying a direct current circuit, and a unitary transformer structure connecting said supply system and said rectifier comprising a primary winding, secondary windings, and auxiliary windings inductively coupled with said primary and said secondary windings to produce a third harmonic voltage in said auxiliary windings, said auxiliary windings being so arranged relative to said secondary windings as to cause the third harmonics in the windings to oppose each other, for the purpose of inhibiting voltage rise at loads below a predetermined value on said rectifier.

3. In combination with a source of polyphase alternating current, a direct current circuit, electric current rectifying apparatus comprising a plurality of anodes, and a transformer comprising a star connected primary winding connected with said source of current and secondary windings respectively connected each with a separate one of said anodes and arranged to form two polyphase star connected groups, of a plurality of auxiliary windings arranged as two groups of series connected polyphase windings inductively coupled with said primary and secondary windings and respectively conductively connected each to the neutral point connection of a different one of said groups of secondary windings and to said work circuit and each arranged in such manner that harmonic voltages induced therein oppose harmonic voltages induced in the group of secondary windings conductively connected therewith to thereby inhibit voltage rise in said work circuit during loads thereon below a predetermined value.

4. In combination with a source of alternating current, a direct current work circuit, electric current rectifying apparatus comprising a plurality of anodes, and a highly saturated transformer comprising a primary winding connected with said source of current, and a secondary winding arranged to form two star connected groups of polyphase coil sections respectively connected each to a separate one of said anodes, of a plurality of auxiliary windings arranged as two open delta connected groups inductively coupled with said secondary winding, the respective said groups of auxiliary windings being conductively connected each to the neutral point connection of a different one of said groups of coil sections and to said work circuit in such manner that third harmonic voltages induced therein exceed in magnitude and oppose in phase third harmonic voltages induced in the group of said coil sections conductively connected therewith whereby the third harmonic voltage resulting from said harmonic voltages is displaced substantially 180° relative to the third harmonic voltage induced in the said coil sections.

5. In an electric current rectifying system, a source of polyphase alternating current, a direct current work circuit, electric current rectifying apparatus comprising a plurality of anodes, and a highly saturated unitary transformer structure comprising a star connected primary winding connected with said source of current, a secondary winding arranged to form two star connected groups of polyphase coil sections displaced 180° and the said coil sections respectively connected each to a different one of said anodes, and a plurality of auxiliary windings arranged to form two open delta connected groups and the windings forming each group thereof being respectively connected each in series with the neutral point of a different one of said groups of coil sections, the said auxiliary windings forming each group thereof being inductively coupled with and uniformly distributed with respect to the group of coil sections conductively connected therewith in such manner that third harmonic voltages induced therein exceed in magnitude and oppose in phase third harmonic voltages induced in the said coil sections conductively connected therewith whereby the third harmonic voltage resulting from said harmonic voltages is displaced substantially 180° relative to the third harmonic voltages induced in the said coil sections.

ERWIN KERN.